(12) United States Patent
Dorenbosch et al.

(10) Patent No.: US 7,453,831 B2
(45) Date of Patent: Nov. 18, 2008

(54) SESSION CONTROL USING A MULTICAST ADDRESS

(75) Inventors: Jheroen P. Dorenbosch, Paradise, TX (US); Niranjan N. Segal, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 821 days.

(21) Appl. No.: 10/870,558

(22) Filed: Jun. 17, 2004

(65) Prior Publication Data

US 2005/0281208 A1    Dec. 22, 2005

(51) Int. Cl.
*H04L 12/16* (2006.01)
(52) U.S. Cl. .................. 370/270; 370/312; 370/338
(58) Field of Classification Search .................. None
See application file for complete search history.

(56) References Cited

U.S. PATENT DOCUMENTS 6,798,755 B2    9/2004 Lillie et al.

2004/0087320 A1*    5/2004 Kim et al. .................. 455/458
2004/0180675 A1*    9/2004 Choi et al. .................. 455/458

OTHER PUBLICATIONS

J. Rosenberg, H. Schulzrine, G. Camarillo, A. Johnston, J. Peterson, R. Sparke, M. Handley, E. Schooler; "SIP: Session Initiation Protocol"; Section 2; pp. 9-10, Jun. 2002.
J. Rosenberg, H. Schulzrine, G. Camarillo, A. Johnston, J. Peterson, R. Sparke, M. Handley, E. Schooler; "SIP: Session Initiation Protocol"; Section 10.2.6; p. 62, Jun. 2002.

* cited by examiner

*Primary Examiner*—Steven H. D Nguyen
*Assistant Examiner*—Tito Pham

(57) ABSTRACT

A method (800, 900) and apparatus (1001) for controlling a session between communication units (141-146) sharing a group Internet Protocol (IP) multicast address. The method includes determining communication units from which a response to a session initiation protocol (SIP) control message is not required and preparing the control message which is sent to the communication units using the group address with information used to control from which of the of communication units the response is required. The SIP control message is sent to a second communication unit using a unicast address indicating that the response is required.

20 Claims, 7 Drawing Sheets

FIG. 8    800

SESSION CONTROL USING A MULTICAST ADDRESS

FIELD OF THE INVENTION

The present invention relates in general to group calls between wireless communication units in a wireless network, and more specifically to a method and apparatus for controlling a session using a multicast address.

BACKGROUND OF THE INVENTION

The need to manage group calls within Radio Access Networks is becoming more prevalent as dispatch services are moving away from traditional two-way radio service to cellular, network, or enterprise network based services such as Wireless Local Area Network (WLAN) including Voice over Internet Protocol (VoIP) services and the like.

One problem facing management of a group call set up in a WLAN environment is the time that would be required to individually address each communication unit in a target list and to wait for individual connections to be established as targets join. Further complications arise if selective and/or conditional targeting is required. Thus, setting up and controlling group calls such as dispatch calls to large groups in a network such as a WLAN VoIP network requires using a broadcast address such as an IP multicast address to contact target communication units simultaneously.

Traditionally, the Session Announcement Protocol (SAP) has been used for group call set up and management purposes. Problems arise however with the use of SAP. For example, in a wireless environment SAP necessarily leads to excessive battery use since, under SAP, all communication units must inspect announcements of any and all group calls being initiated using SAP.

One approach is to use the Session Initiation Protocol (SIP) as more fully described in Internet Engineering Task Force (IETF) Request For Comments (RFC) 3261. However, traditional SIP messages can not be delivered to a call target using a multicast address. Also, responses to SIP messages can be verbose adding delay to call set-up and adding load to the network. It is well known that SIP can be used to set up a conference call using multicast, see, for example, RFC 3261, section 2, Overview of SIP Functionality. However, the multicast address is used only for the bearer portion of the conference call and not for broadcast of the SIP signaling messages. Other IETF documents, such as RFC 2543 and RFC 3261 discuss the use of SIP with a multicast address. However, a multicast address is only allowed for use when a SIP REGISTER message must be sent, for example in a case where a User Agent (UA) communication unit does not know how to find the SIP registrar (RFC 3261, section 10.2.6, Discovering a Registrar). In other SIP literature it has been suggested that a UA initiating a session can also send the initial INVITE to an ALL SIP SERVERS multicast address, in a case where the UA does not know how to find the proper SIP server. Such a method, aside from not being adopted for standards purposes, has drawbacks in that it fails to address the need to contact all participants of a group or target communication units associated with a group call.

In co-pending U.S. patent application Ser. No. 10/334,521 session control is described using a multicast address and a mixture of SIP and SAP. However, the above identified application fails to describe a system for managing and controlling group calls using SIP and a multicast address.

Therefore, to address the above described problems and other problems, what is needed is a method and apparatus for facilitating session control in a group call.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
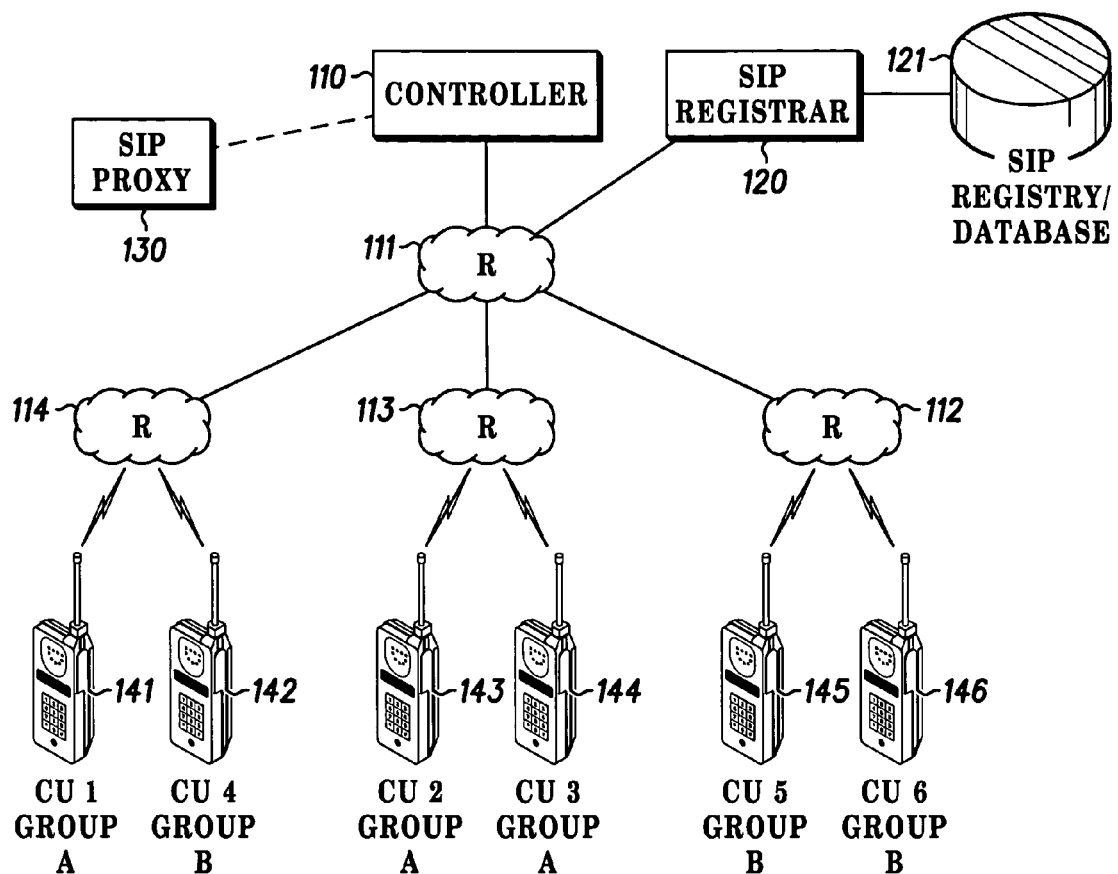
FIG. 1 is a diagram illustrating a simplified and representative environment associated with an exemplary SIP registrar, an exemplary controller, and exemplary communication units in a wireless network in accordance with various exemplary embodiments.

In overview, the present disclosure concerns wireless communications devices or units, often referred to as mobile stations or communication units, such as cellular phones or two-way radios and the like associated with a communication system such as an Enterprise Network, a cellular Radio Access Network, a Radio Access System, an Integrated Digital Enhanced Network, a WLAN or the like. Such communication systems may further provide services such as voice and data communications services to communication units. More particularly, various inventive concepts and principles are embodied in systems, communication units, and methods therein for controlling a session using a multicast address. It should be noted that the term communication unit may be used interchangeably herein with two-way radio, mobile station, mobile subscriber unit, subscriber unit, wireless subscriber unit, wireless subscriber device or the like. Each of these terms denotes a device ordinarily associated with a user and typically a wireless mobile device that may be used with a public network in accordance with a service agreement or within a private network such as an enterprise network. Examples of such units include personal digital assistants, personal assignment pads, and personal computers equipped for wireless operation, a cellular handset or device, or equivalents thereof provided such units are arranged and constructed for operation in the manner described herein.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

The communication systems and communication units of particular interest are those providing or facilitating voice communications services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, 4G PTT, Internet Protocol (IP) Wireless Wide Area Networks like 802.16, 802.20 or Flarion, integrated digital enhanced networks and variants or evolutions thereof. Furthermore the wireless communication units or devices of interest may have short range wireless communications capability normally referred to as WLAN capabilities, such as IEEE 802.11, Bluetooth, or Hiper-Lan and the like preferably using CDMA, frequency hopping, OFDM or TDMA access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector.

As further discussed herein below, various inventive principles and combinations thereof are advantageously employed to manage and otherwise control a group call session using a multicast address.

Referring now to FIG. 1, a simplified and representative exemplary scenario 100 associated with SIP session control using a multicast address will be discussed and described. In accordance with various exemplary embodiments, an exemplary architecture includes call controller 110 for arbitrating a session between communication units 141-146. It will be appreciated that while controller 110 handles session control, other controllers within the Radio Access Network (RAN), Radio Access System (RAS) or the like may be aware of the session, but do not play an active role. The choice of session controller 110 may be made dynamically and may depend on which mobile User Agent (UA), or which of communication units 141-146 initiates the session, or may depend on the location or network of the initiating UA or CU. Further, multi-cast capable routers 111-114 may be used to support an expanded local and/or wide-area network in accordance with various exemplary embodiments.

It should be noted that in describing various exemplary embodiments, the following assumptions are helpful. First we assume that communication units 141-146 may be grouped and that different groups use different multicast addresses. For example, communication units 141, 143, and 144 belong to Group A and have a multicast address associated with Group A, and communication units 142, 145, and 146 belong to Group B and have a multicast address associated with Group B. One of ordinary skill in the art will appreciate that in accordance with various exemplary embodiments, a single communication unit can belong to multiple groups and have multiple multicast addresses associated with these groups such that, for example, any messages directed to any of the groups using the respective multicast addresses for the groups will land at the single communication unit. All member communication units associated with a group are preferably aware of the group's multicast address well in advance of the start of the session. There typically are a large number of participating group members although the present invention may be practiced on fewer communication units. Call setup and control is performed, for example by controller 110, according to a protocol and preferably according to Session Initiation Protocol (SIP) as noted above or as modified in accordance with the invention. Multicast addressing is used for both bearer and signaling channels, including sending of the initial INVITE to the target members or communication units.

It should be noted for background purposes that group member communication units 141-146 have performed an Internet Group Management Protocol (IGMP) ip igmp join-group <group-address> using the group's multicast address to join the group before the start of the session. It will be appreciated that communication units 141-146 may join more than one group and may also join a session while in progress although immediate access is not assured. Packets sent to the group's multicast address will reach the member communication units that have joined and are within the coverage area of the network. When the Protocol Independent Multicast Source Specific Multicast (PIM-SSM) routing protocol is being used, packets are sent from a single source such as call controller 110 or an associated module or the like. Other multicast routing protocols can be used as well, such as PIM-SM (Sparse Mode) and PIM-DM (Dense Mode). In accordance with various exemplary embodiments, multicast is used for at least downlink communication packets.

In an exemplary network topology, downlink multicast packets are not sent via SIP proxies such as through SIP proxy server 130 although they could be in some circumstances. It is further preferred that uplink control messages, such as session requests, are sent using the unicast address of call controller 110, which address is known to communication unit group members participating in the call during the session and before the start of the session, and is at least known to the UA communication unit initiating the call or session. In accordance with various exemplary embodiments, participating communication units 141-146 or UAs preferably learn controller 110's unicast address in the standard manner under SIP, namely from the contact address appearing in the downlink INVITE message in accordance with for example IETF RFC 3261 which states in part: "the Contact header field tells other elements where to send future control messages".

It is further assumed that a single call controller 110 is being used for call setup and arbitration however, a participant can send a SIP control message to all other participants without requesting a response. For example, a participant may want to send a SIP INFO to the group multicast address indicating that the channel has been released, and a response from the other members is not needed. Moreover, call controller 110 and participating communication units 141-146 preferably have a mechanism to agree on network resource assignments such as selection of a common vocoder although call controller 110 may specify the vocoder to be used. The resource assignment mechanism is at least partially separate from mechanisms associated with call set up and the like and does not fully depend on session parameter negotiation methods provided by SIP. For example, the controller 110 may know the vocoders supported by each of the communication units 141-146 and may select a vocoder that is supported by all participating communication units.

Thus in an exemplary group call, dispatch call, session or the like in accordance with various embodiments, certain control messages do not require a response while other messages require responses either from specific participants or from a subset of participants based on other conditions which may apply. In order therefore to use SIP messages with a multicast address for a group it must be specified, either in a specific or more general manner, from which of, for example, target communication units 141-146 either a response or no response is required. It will be appreciated that for some downlink messages, call controller 110 does not need or want a response. For example, controller 110 may regularly inform participants in the group call, who has joined or who has left. Controller 110 can package and send information about the current call membership in a SIP INFO message which is preferably transmitted using the multicast address for the target group and which is preferably repeated periodically. Since call membership information is not critical to the session and since it is periodically retransmitted, acknowledgements are not required by controller 110. Controller 110 may also send re-INVITES during an ongoing group call to support late additions joining the call once it is in progress. Target communication units already participating in the group call need not respond.

It should be noted that a late-joining communication unit can start to receive audio associated with a call soon after it performs a join such as an Internet Group Management Protocol (IGMP) join, soon after it comes into coverage. However, the joining communication unit needs information contained in the SIP INVITE to properly participate in the call in accordance with various exemplary embodiments. In particular, the joining communication unit needs to know, for example, the 'contact' address of call controller 110, the SIP Call-ID of the session associated with the call, and the vocoder that is being used for the call.

In accordance with other exemplary embodiments, controller 110 can selectively seek responses from an individual one or a subset of target communication units 141-146. For example, controller 110 may only want a response from one or more specific communication units such as when "the floor", or air channel is granted to a specific talker, controller 110 may only want a response from the specific talker. At the same time, controller 110 may want to inform all participants that the floor has been granted in order to suppress further requests to talk that would not be granted anyway. However, since audio will likely begin in connection with granting the floor, call participants will likely refrain from such request. Therefore, controller 110 does not require a response from most call participants although controller 110 may want a response from the granted talker, to confirm the grant was correctly received. In accordance with still another exemplary embodiment, controller 110 may not want to begin a group call until specific target communication units are present in the call such as, for example, a dispatcher or team leader. Still further, controller 110 may want a response from a minimum number such as a required number of target communication units. It will be appreciated that controller 110, for example, will not start a group call without at least two participating communication units.

Figure 2:
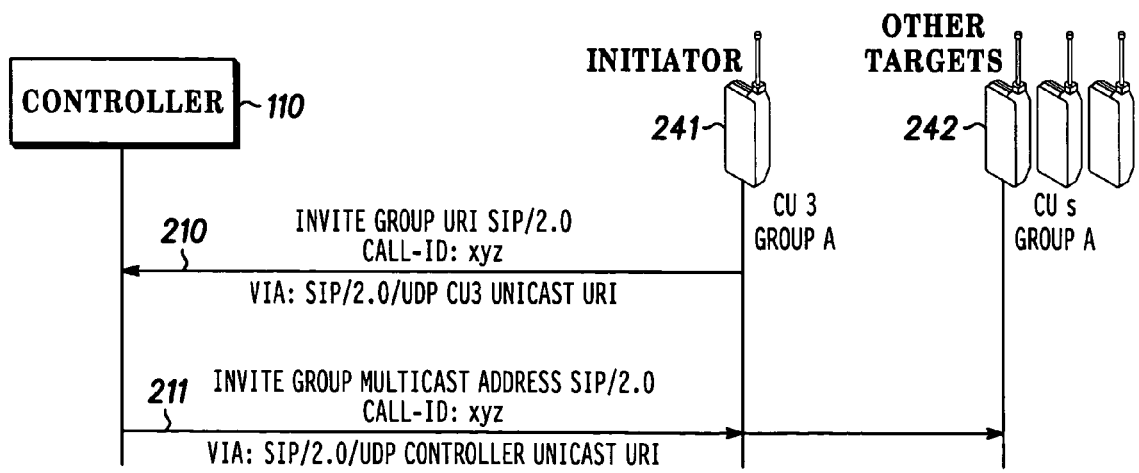
FIG. 2 is a diagram illustrating an exemplary communication unit initiating a group call to target communication units through an exemplary multicast controller in accordance with various exemplary embodiments.

With reference to FIG. 2, exemplary scenario 200 shows an initiating communication unit 241 attempting to initiate a group call or session between itself and target communication units 242 sharing a group address with initiating communication unit 241. In normal SIP initiation, initiating communication unit 241 would send SIP messages using respective unicast addresses to all targets with the attendant disadvantages described above. In accordance with various exemplary embodiments, however, controller 110 could send multicast INVITE message 211 in response to an initial INVITE message 210 sent from initiating communication unit 241. According to SIP, a standard initiator cannot accept a re-INVITE before the original session is established with an "200 OK" final response. Hence exemplary scenario 200 is not legal under conventional SIP.

One solution in accordance with various exemplary embodiments, includes modifying communication unit behavior such that initiating communication unit 241 allows and recognizes the reception of multicast INVITE message 211 after sending unicast INVITE message 210 destined for a group. Multicast INIVTE message 211 would use the same SIP Call-ID and associated tags as the initial unicast INVITE message 210. In accordance with various exemplary embodiments, initiating communication unit 241 can be configured to recognize a multicast INVITE message 211 and interpret it as an acknowledgement of unicast INVITE message 210. Initiating communication unit 241 would no longer retry initial unicast INVITE message 210 even though no "200 OK" was received for it. Initiating communication unit 241 further acts as if the session was started based on multicast INVITE message 211, except that, by default, initiating communication unit 241 will assume itself to be the first talker. Since an exemplary communication unit preferably needs modification to support SIP-controlled dispatch in accordance with the exemplary embodiments, described herein, the above noted departure from standard SIP should not be a great cause for concern. Note that, aside from initiating communication unit 241, all other target communication units 242 will only see the second invite message, or multicast INVITE message 211. To facilitate uniqueness and facilitate recognition of multicast INVITE message 211, another SIP method name could be used. A generic message name like 'INFO' could be used, or a new name such as 'GROUP_INVITE' could be devised and used.

As noted above, in many cases, particularly with regard to SIP messages sent using a multicast address to reach a group of target communication units, no response is required. For multicast SIP control messages, such as downlink control messages, where the sender does not want a response, the sender may insert an exemplary header in accordance with various exemplary embodiments, specifying that no response is required. The new header which can be referred to as a NoResponse header, is specified as follows:

INFO multicast address SIP/2.0;
NoResponse;
Call-ID: . . . ;
To: . . . ;
From: . . .
; . . .

However, since adding a newly specified SIP header would require acceptance and widespread adoption of the new standard, an exemplary embodiment may be configured to use an existing header in a new way. For example, the Via header may be used by specifying an undefined response address. It will be appreciated by one of ordinary skill in the art that in accordance with IETF RFC 3261, the Via header field tells other elements such as communication units where to send a response. For example, controller 110 acting as the issuer of the exemplary multicast SIP message can specify: Via: SIP/2.0/UDP 000.000.000.000, or Via: SIP/2.0/UDP NULL. Thus a group member communication unit receiving the above specified Via header either recognizes the control message as one for which no response is required, or can proceed to respond sending response data to IP address 0.0.0.0 or to a null address, which void address is known to those of ordinary skill in the art as the 'bit bucket.' Sending data to the null or undefined address effectively results in no response being sent. It should further be noted that to increase reliability, a sender can repeat each multicast control message.

Figure 3:
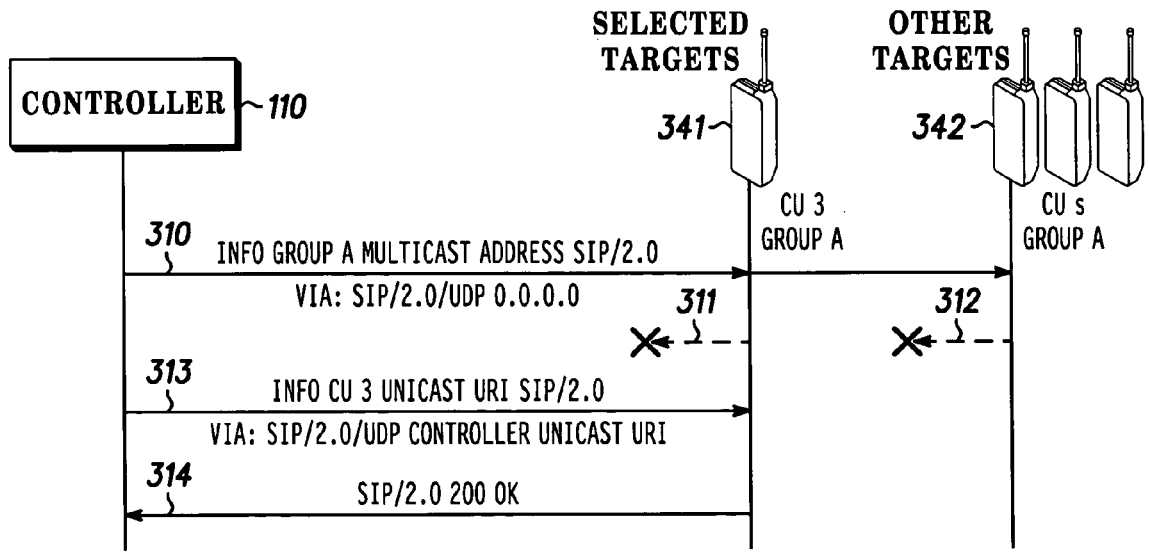
FIG. 3 is a diagram illustrating an exemplary selected target communication unit and other target communication units and an exemplary multicast controller in accordance with various exemplary embodiments.

As also noted above, many SIP control messages in accordance with various exemplary embodiments require responses from selected communication units only, which can be performed as described herein below with reference to FIG. 3. An exemplary sender such as controller 110, first sends SIP control message 310 to target communication unit or mobile station (MS 3) 341 belonging to the selected communication units or mobile stations (MSs) of the target group and the other communication unit 342 belong to the target group using the multicast address of the group and using one of the above described methods to specify that no response is required at for example 311 and 312. In SIP control message 310—a SIP INFO message—an undefined address of 0.0.0.0 is used. To elicit the responses from the selected target communication units, controller 110 then repeats the SIP control message using unicast addresses of the selected target communication units and sends repeated control message 313 to each of the selected target communication units, the repeated message having been modified e.g. to specify the response address in the Via header in the standard manner. By sending control message 310 to the group using a multicast address and by sending a copy of control message 313 to each of the selected communication units such as communication unit 341 using a unicast address and specifying the response address as noted above, an exemplary response 314 will be received from the selected target communication units. It should be noted that repeated SIP control message 313 may be routed in a fully SIP standard compliant manner and can further be routed using SIP proxies and, for example, SIP proxy server 130 in FIG. 1, if necessary. Alternatively, another new header may be defined that can be inserted into the SIP multicast control message. The new header specifies selected target communication units that shall respond and also includes the destination address for the response. An exemplary header may be defined as follows:

INFO multicast address SIP/2.0;
Via: SIP/2.0/UDP 000.000.000.000;
Selected-Via: CU3.nextel.com SIP/2.0/UDP 123.345.567.789, . . . ,
Selected-Via: CUn.nextel.com SIP/2.0/UDP 123.345.567.789;
Call-ID: . . . ;
To: . . . ;
From: . . . ;
and the like.

Thus in accordance with exemplary embodiments, target communication units 342 not included in the list of selected targets would not respond, while the selected communication unit CU3 341 and CUn (not shown) would send response 314 to the selected address. It is important to note that the response address specified in the Via header can be a unicast or a multicast address.

Figure 4:
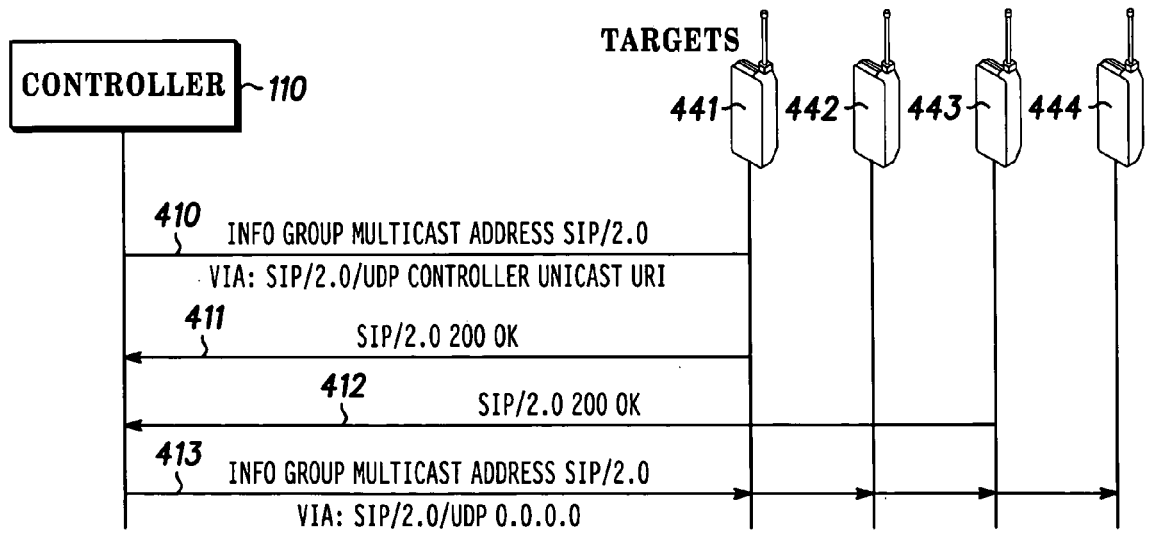
FIG. 4 is a diagram illustrating exemplary target communication units and an exemplary multicast controller with exemplary responses and cessation of responses in accordance with various exemplary embodiments.
Figure 5:
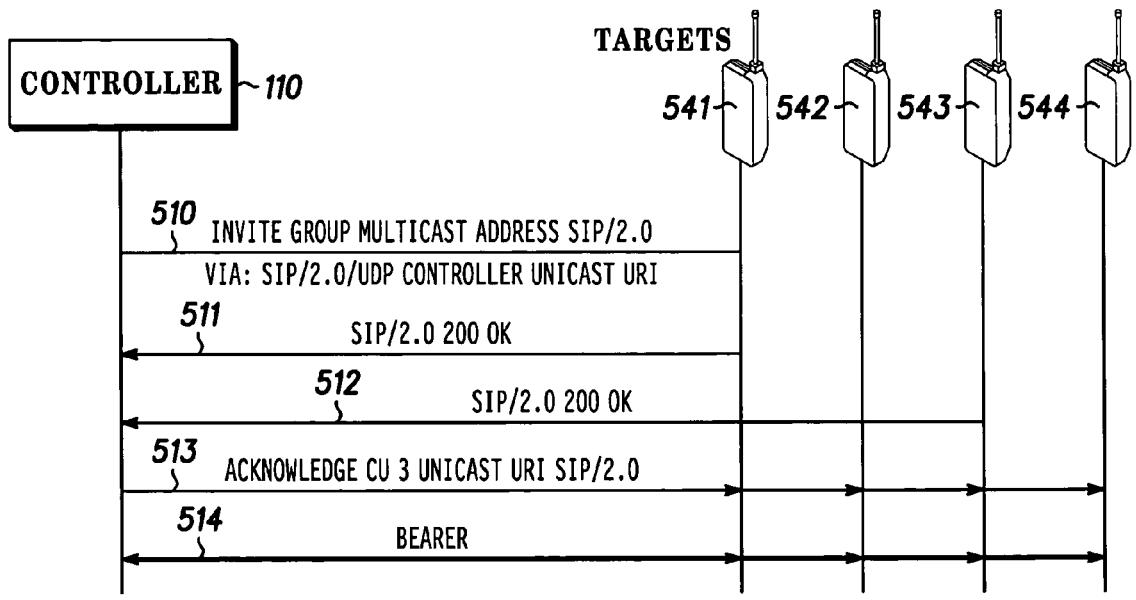
FIG. 5 is a diagram illustrating exemplary target communication units and an exemplary multicast controller with exemplary responses and cessation of responses and bearer setup in accordance with various exemplary embodiments.

In accordance with still other exemplary embodiments for example as illustrated in FIG. 4, a SIP message may be sent needing a minimum required number of responses. In accordance with one exemplary implementation, a sender such as controller 110, first sends SIP control message 410 using the multicast address for the group of communication units 441-444, and specifying a response address in the Via in the manner described herein above as the standard manner. In such an instance, all communication units 441-444 receiving SIP control message 410 will try to respond to the specified address. To achieve the minimum number of required responses, the sender, for example controller 110, may count responses such as responses 411 and 412 received from communication units 441-444. When a required number of responses is received, controller 110 may repeat the SIP control message with an undefined or null response address now specifying that no response is needed by repeated SIP control message 413. As is shown in the figure, the repeated SIP control message is modified to specify that no response is needed. It should be noted that FIG. 4 depicts limiting the number of responses associated with an INFO control message. Such a scenario, using an INFO control message, can be considered an unusual approach, since dispatch call responses are normally limited to responses to an INVITE control message which can provide a more natural implementation as shown in FIG. 5. It should be noted that in accordance with various exemplary embodiments, sending the repeated SIP control message can further be used to control the call, for example by modifying the repeated control message according to the changed destination or response mode and, for example, any sequence numbering or the like, as may be required by the protocol.

Controller 110 may generate SIP ACK 513 as soon as the required number of responses is received. ACK 513 then signals the establishment of bearer connection 514. ACK 513 further stops any pending retransmissions of "200 OK" responses 511 and 512, for example in accordance with IETF RFC 3261, section 13.3.1.4. Thus in accordance with a preferred embodiment, target communication units 541-544 will also cease generating new "200 OK" responses when ACK 513 is received. It should be noted that behavior after an early ACK is not defined in RFC 3261.

In accordance with still other exemplary embodiments, responses may be deferred. It should be noted that response limiting described in the previous section may not be very effective since many of target communication units 541-544 will receive the initial multicast SIP control message 510 at more or less the same time and will tend to respond more or less simultaneously. When most of target communication units 541-544 are in the same cell, the MAC layer associated with the cell will throttle responses even for UDP and spread responses over time, which may give controller 110 a chance to count the first few responses and stop the flow of responses before all of target communication units 541-544 have responded. However, when target communication units 541-544 are distributed over multiple cells, responses may arrive quickly before limiting as described above can do much good. A sender can further simply absorb the responses and sends and ACK when the desired number of responses has been received. Thus, by the time the responses are counted and a message specifying no response is sent, more than the required number of communication units will likely have already responded. Thus, if a desirable goal associated with limiting the number of responses is to limit the response processing load on controller 110 and protect controller 110 from a large number of responses, a new method to spread the responses in time can be used which may be used with or without defining new headers.

In accordance with various exemplary embodiments, a target communication unit receiving a SIP control message on a multicast address can define a maximum time duration and can delay any response by a random amount of time within the range [0, to max time duration]. It will be appreciated that the time duration can be related to one of the SIP timers, can be fixed by provisioning, or can be related to an estimate by the target of the size of the group. It will be appreciated that the target may estimate the group size from a previous call, may obtain the group size through provisioning, or may know it through information obtained from the user interface, such as the contact list or target list for the call. For small groups, the target uses a short duration such as 30 ms and for large groups it uses a longer duration such as 2 seconds.

In accordance with various other exemplary embodiments, an exemplary sender can specify the maximum time duration directly or indirectly. A sender such as controller 110 can specify the maximum time duration directly using a newly defined header, such as Response-Interval: x ms, or may specify the maximum time duration indirectly by attaching an expiration header to the SIP INVITE message and agreeing on a convention such as a convention that the maximum time duration is a specific fraction of the expiration time in the expiration header. It is also possible in accordance with various alternative exemplary embodiments, to let targets multicast responses resulting in each target seeing the responses sent by other targets and to let the controller 110 specify the number, N, of responses required. Targets can thus be programmed not to send a response after it sees N responses from other targets. For such alternative exemplary embodiments, controller 110 specifies, for example in the VIA, that responses are to be sent to the group using the multicast address. The value of N may also be communicated to the group in the control message, during session setup, or may be programmed into the CU. The value of N may depend on the session type and on the control message type. For example, for an INVITE control message for a session type of group dispatch call, N could be 2. Such a call is thus allowed to proceed as soon as 2 participants have responded.

In accordance with still other exemplary embodiments, a list of active participants in a call is desirable. Controller 110 and communication units involved in the call are likely to want to know which communication units are on the group call. To determine who is on the call, controller 110 could inspect Real Time Protocol (RTP) packets and Real Time Transport Control Protocol (RTCP) packets. However, since it is desirable to separate signaling and bearer paths and since controller 110 may not see RTP packets, such an approach is undesirable. Controller 110 may also require a response for the first multicast INVITE, but not for later re-INVITEs and INFO messages thus "200 OK" messages from individual communication units may not be received and processed leaving controller 110 with incomplete information as to who exactly is on the call.

Alternatively, each target communication unit that receives a multicast SIP INVITE message can send a SIP message to the unicast contact address associated with the originator of the SIP INVITE including information on its identity. A preferred SIP control message would be a SIP INFO with an ID associated with the target communication unit included in the "From" header. The payload of the SIP INFO message could be as simple as including text such as "joined" indicating that the target communication unit is now part of the call. Target communication units responding in this manner would randomize the messages over a limited duration of several seconds. The recipient, such as controller 110, acknowledges the SIP INFO in the standard way, such as a "200 OK" message, preferably using unicast, so that the sending communication units know that the SIP INFO message has been received and need not be repeated.

Figure 6:
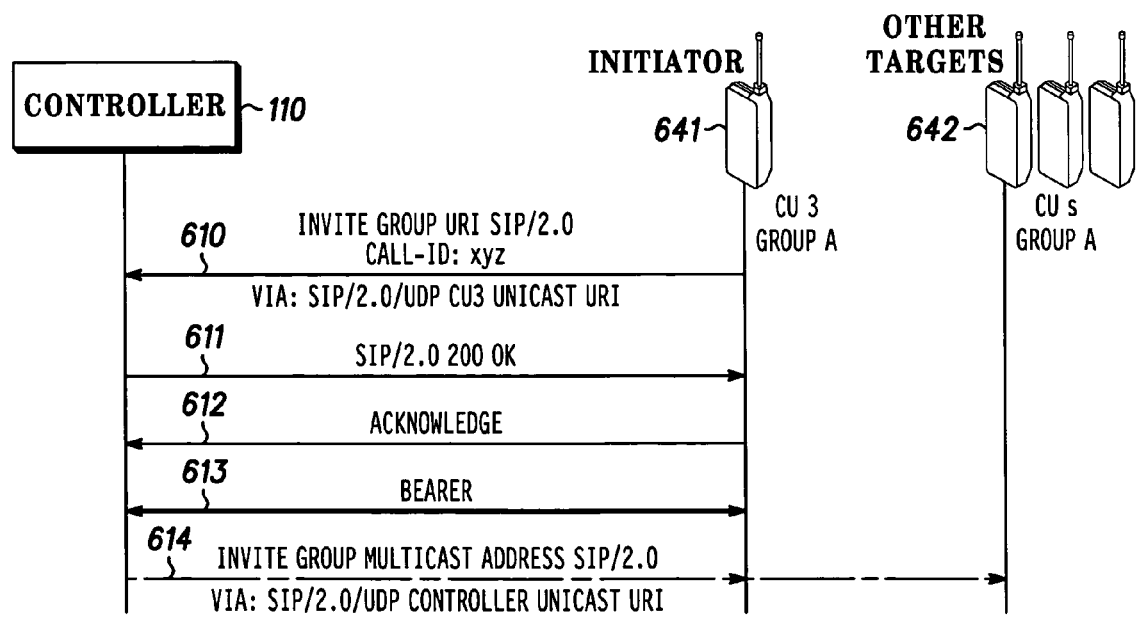
FIG. 6 is a diagram illustrating an exemplary initiating communication unit, exemplary target communication units and an exemplary multicast controller with exemplary bearer setup in accordance with various exemplary embodiments.

To better understand group call initiation using a multicast address in accordance with various exemplary embodiments, for example as shown in FIG. 6, call controller 110 must handle initiating communication unit 641 or UA in a special manner. It can be assumed that initiating communication unit 641 or UA uses a unicast address to send initial SIP INVITE 610 for the group call to its SIP server such as controller 110. In the event that SIP server 130 is used, SIP server 130 becomes the call controller, or alternatively forwards the SIP INVITE to call controller 110. It should also be noted that initiating communication unit 641 is a preferably a member of the group associated with the multicast address. Problems arise in that initiating communication unit 641 or UA receives a multicast SIP INVITE for the call it is trying to initiate. Controller 110 cannot simply respond with "200 OK" message 611 and then send SIP INVITE 614 to the group using the multicast address since the initiating communication unit 641, on reception of the "200 OK" message 611 will send an ACK 612 that starts transmission on bearer 613 as shown.

Figure 7:
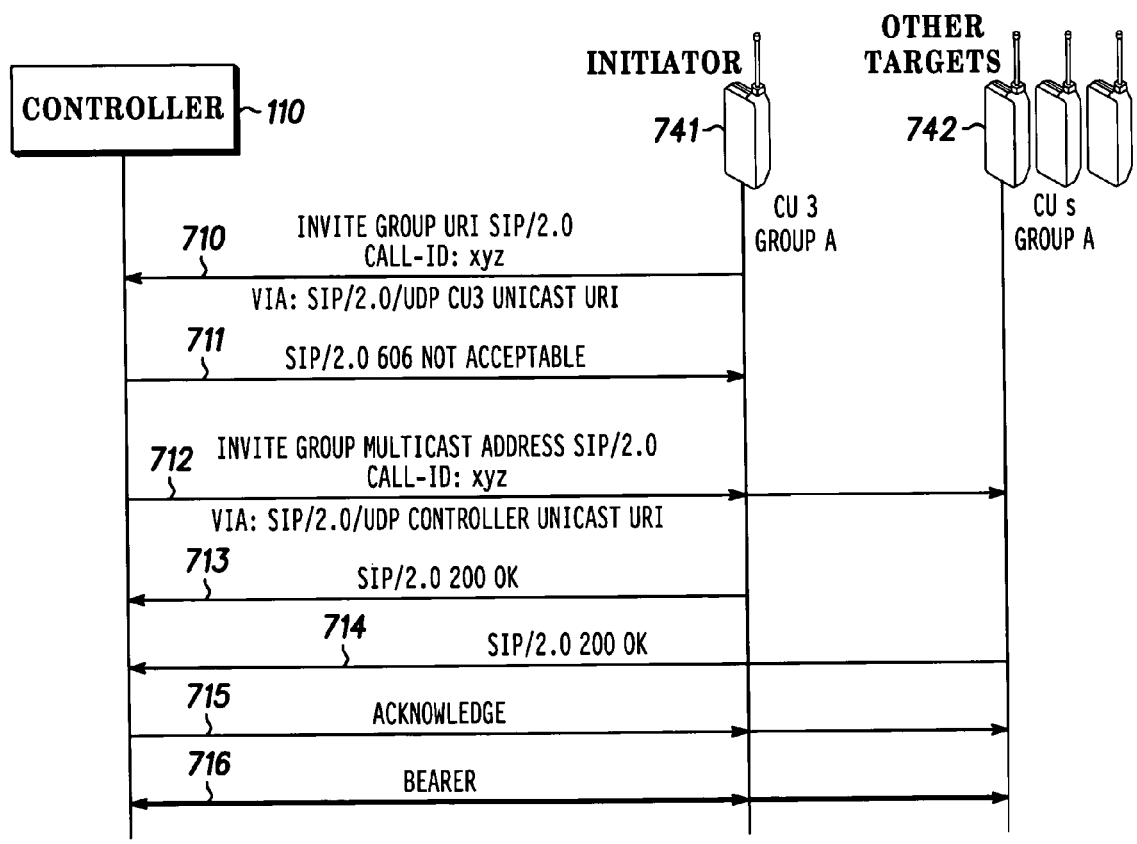
FIG. 7 is a diagram illustrating an exemplary initiating communication unit, exemplary target communication units and an exemplary multicast controller with exemplary bearer setup in accordance with various alternative exemplary embodiments.

Thus to start the group call in accordance with various exemplary embodiments, controller 110 can refuse the initial SIP INVITE 710 as shown in FIG. 7, and independently start a new call. Controller 110 preferably sends an error message 711 to the initiating communication unit 741 to terminate the initial session request and immediately sends a SIP INVITE 712 for the group call using the multicast address. It will be appreciated that possible controller responses which can be used to terminate the initial SIP INVITE 710 are: CANCEL; 380 Alternative Services; 403 Forbidden; or 491 Request Pending. One other effective response for error message 711 includes a "606 Not Acceptable" response. It will be appreciated that a 606 Not Acceptable is specified in IETF RFC 3261 and indicates that a user agent or communication unit was contacted successfully, but some aspects of the session description such as the requested media, bandwidth, or addressing style were not acceptable accompanied by a warning code. In accordance with various exemplary embodiments, the warning code could include, for example, code 331—unicast not available will call back immediately. After sending error message 711, controller 110 immediately sends SIP INVITE 712 using the multicast address for the group making initiating communication unit 741 the first talker. Controller 110 can use the same Call-ID so that initiating communication unit 741 can associate the new session with its initial request.

It should be noted that in certain instances, for example in accordance with current Integrated Digital Enhanced Network procedures, a non-group member cannot call the group, and thus the above method does not function in such an application. Thus if a non-member calls a group that uses a multicast address, controller 110 must serve the non-member separately on the non-member's unicast URI/address to allow for callback and the like. If controller 110 cannot figure out whether the initiating communication unit is a group member the initiating communication unit may be served using the unicast address resulting in the initiator seeing duplicate commands, on its unicast and on its multicast address.

Figure 8:
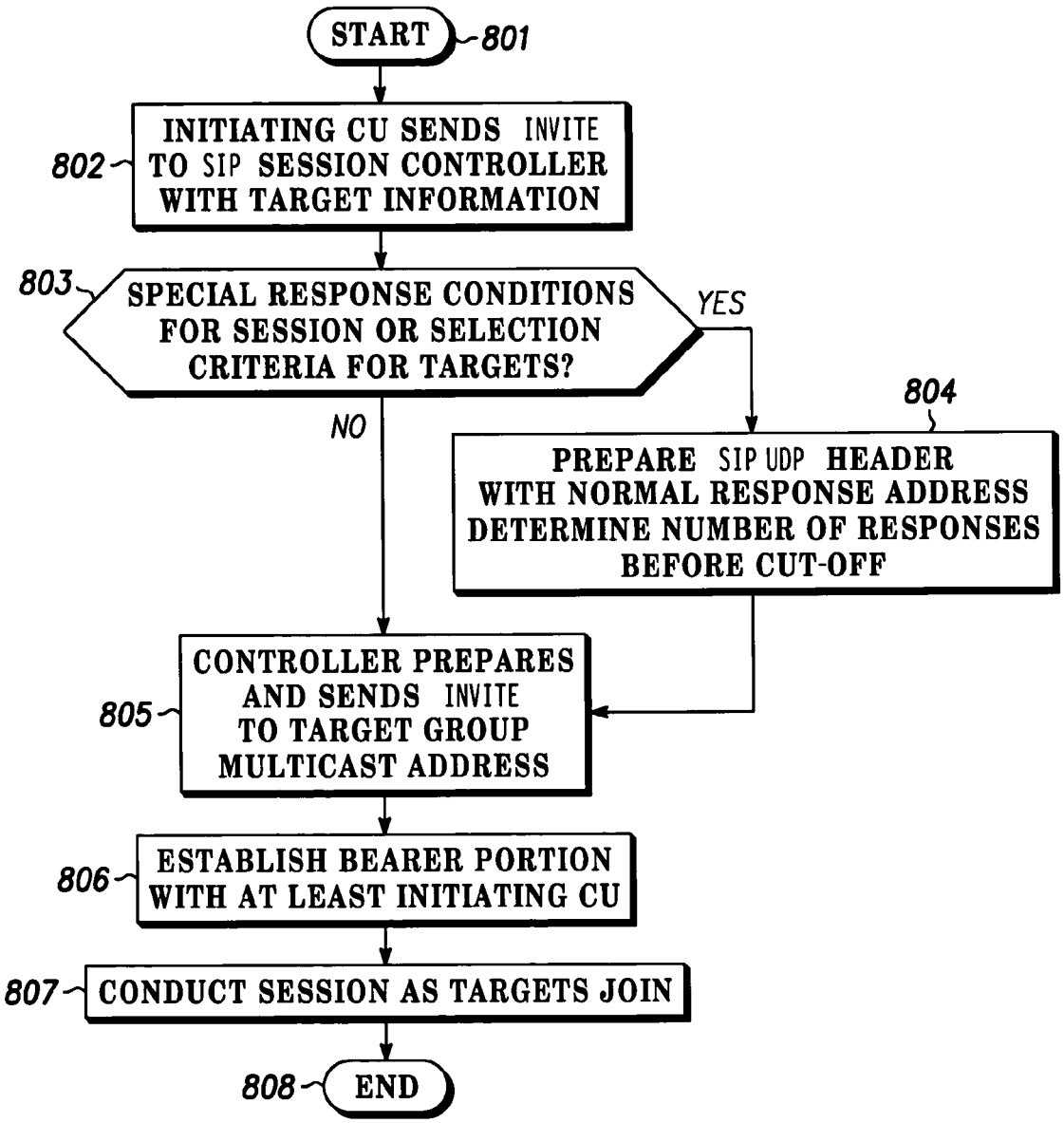
FIG. 8 is a flow chart illustrating an exemplary group call setup procedure using a multicast address in accordance with various exemplary and alternative exemplary embodiments.

In accordance with various exemplary embodiments, an exemplary procedure for example, for call controller 110 to enable a group call, is shown in FIG. 8. After start at 801, a unicast SIP INVITE message associated with a group call may be received from an initiating communication unit at 802. Call controller 110 may determine, for example, that the group needs multicast group call control, and may determine whether any special conditions are present as noted above such as a limited number of responses, a roll call, or the like at 803. Call controller 110 may also verify that the initiating communication unit is a group member. If special conditions are present, such as for example, a limited number responses as described above, a SIP message with, for example, a modified header may be prepared at 804 along with a SIP message having a null response address to cut off responses. At 805, controller 110 may prepare and send a multicast Session Initiation Message such as a SIP INVITE using the multicast address to the group at 805. A bearer portion may be set up at 806 with at least the initiating communication unit and the session proceeds at 807 as communication units join the call. The procedure ends at 808 as all members have joined subject to re-INVITES and late joins as noted above. It should be noted that controller 110 can refrain from sending a unicast "200 OK" to the initiator, can cancel or fails the unicast INVITE under certain conditions. The initiating communication unit can be configured to interpret the multicast Session Initiation Message as a response to the unicast SIP INVITE sent, for example, at 802.

In accordance with various alternative exemplary embodiments, the initiating communication unit may start a group call by sending a first SIP call setup message, receiving a second SIP call setup message for the group before the reception of a response to the first SIP call setup message. The initiating communication unit may determine that the first and the second SIP call setup messages are related and may thus continue the setup of the call specified by the second SIP call setup message. The initiating communication unit may present the call to, for example, a user as being setup by based on the first SIP setup message. It will be appreciated that the second SIP call setup message is preferably received on a multicast address.

In accordance with still other various alternative exemplary embodiments, a call controller may enable a group call by using a multicast address on a downlink using, for example, Protocol Independent Multicast Source Specific Multicast (PIM-SSM). Call controller 110 may initiate a SIP session by sending a SIP INVITE to group members using a multicast address, specifying in the SIP INVITE a bearer downlink with the c=field (Connection data) equal to the multicast address to which the controller will send the bearer data. It will be appreciated that the downlink specification uses a=sendonly. Group member communication units will receive RTP packets on the multicast address. Call controller 110 may further specify in the SIP INVITE a bearer uplink with the c=field equal to controller 110's unicast address with the uplink specification using a=recvonly. Group member communication units will send RTP packets to the unicast address.

It will further be appreciated that in accordance with various other alternative exemplary embodiments, a list of target communication units for a group call may be formed dynamically or statically, where some of the target communication units are invited and controlled using unicast addresses and at least one group sharing a multicast address is invited and controlled using the multicast address.

Figure 9:
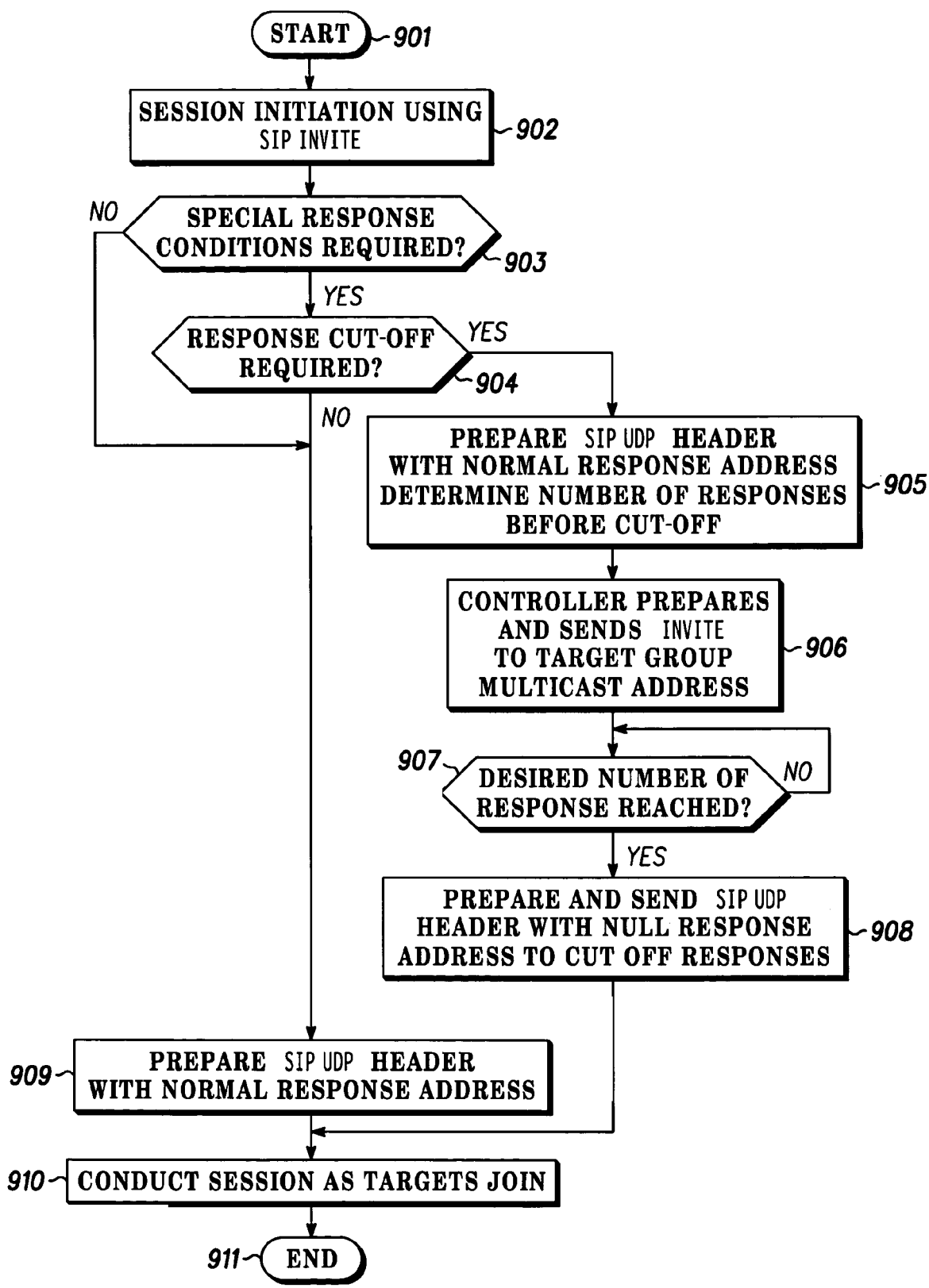
FIG. 9 is a flow chart illustrating another exemplary group call setup procedure using a multicast address in accordance with various exemplary and alternative exemplary embodiments.

Referring to FIG. 9, another flowchart is shown illustrating another exemplary procedure for session control in accordance with various exemplary embodiments. After start at 901, a session initiation may be carried out either by an initiating communication unit as described above using a unicast address to call controller 110, or call controller 110 may initiate the session at 902. Special response conditions may be determined at 903 and if present, it may be determined whether, for example, a cut off in the number of responses is required at 904. If a cut off is required, a SIP message such as a SIP INVITE message is prepared with a normal response address at 905 and the number of responses is determined. It will be appreciated that by sending the SIP INVITE for example at 906, with a normal response address on the multicast address for the group, responses will be forthcoming for all communication units receiving the SIP INVITE. At 907, it is determined whether the desired number of responses has been reached and if so, a SIP message may be sent with a null response address to cut-off further responses. If a cut-off is not required at 904, a SIP header may be prepared with a normal response address at 909 and the call may proceed at 910 as target communication units join the call. The procedure may end at 911, again subject to re-INVITING and late joining as described above.

Figure 10:
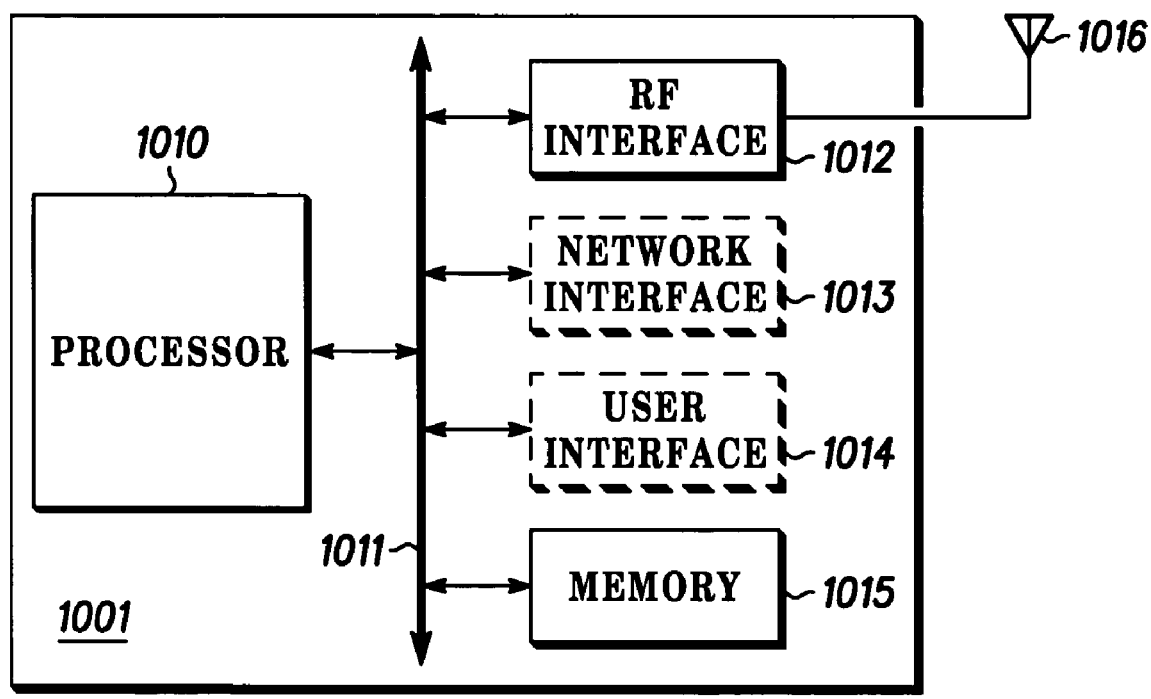
FIG. 10 is a diagram illustrating an exemplary apparatus in accordance with various exemplary and alternative exemplary embodiments.

To better appreciate the application of the above described exemplary procedures and inventive principles, an exemplary apparatus is shown in FIG. 10. It will be appreciated that apparatus 1001 may be an exemplary device such as an exemplary initiating communication unit or an exemplary call controller without departing from the invention. In any case, apparatus 1001 preferably includes processor 1010, memory 1015, and RF interface 1012 coupled by bus 1011. RF interface 1012 may include antenna 1016 to send and receive signals over an air interface or the like, and optionally network interface 1013 may provide an interface to a network such as a Local Area Network (LAN), a Public Switched Telephone Network (PSTN), a Wireless Local Area Network (WLAN) or other network as would be appreciated by one of ordinary skill. Apparatus 1001 may also be provided with user interface 1014, particularly when apparatus 1001 is embodied as a communication unit, User Agent or the like. It will further be appreciated that as the inventive principles described herein are suitable for implementation in, for example, a software program, the instructions associated with the computer program and capable of being read by processor 1010, may preferably be stored in memory 1015 and may be executed in order to perform the useful functions and routines described herein.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for controlling a group call session between a plurality of communication units sharing a group address, the group call session controlled according to a session initiation protocol (SIP), the SIP specifying an SIP control message capable of being transferred to each of the plurality of communication units at an individual address and a response from the each of the plurality of communication units to the SIP control message, the method comprising:

determining a first one or more of the plurality of communication units from which the response to the SIP control message associated with the SIP is not required; and preparing the SIP control message using the group address including information associated with the first one or more.

2. A method in accordance with claim 1, further comprising sending the SIP control message to the plurality of communication units using the group address, the information associated with the first one or more used to control from which of the plurality of communication units the response is required.

3. A method in accordance with claim 1, wherein the group call session including a dispatch group call session.

4. A method in accordance with claim 1, wherein the preparing the SIP control message includes specifying in a portion of the SIP control message that the response is to be sent to the group address, and further specifying a number of responses required before no further responses are required.

5. A method in accordance with claim 2, wherein the group address includes an Internet Protocol (IP) multicast address.

6. A method in accordance with claim 1, further comprising:

preparing a second one of the SIP control message using a unicast address of a second one of plurality of communication units; and sending the second one of the SIP control message to the second one of the plurality of communication units indicating that the response is required from the second one.

7. A method in accordance with claim 1, wherein the information includes a NoResponse header.

8. A method in accordance with claim 1, wherein the SIP control message includes a VIA header having one of a NULL response address, an undefined response address, and an indeterminate response address, the one indicating that the response is not required.

9. A method in accordance with claim 1, further comprising:

sending the SIP control message to the plurality of communication units using the group address, wherein the determination of the first one or more includes a determination that the first one or more from which a response is not required includes none of the plurality of communication units and wherein the preparing the SIP control message using the group address includes information about the none such that a response is required from all of the plurality of communication units; and sending a second one of the SIP control message to the plurality of communication units using the group address, wherein the first one or more associated with the second one includes the all of the plurality of communication units, the second one sent after a predetermined number of the plurality of communication units has responded to the sending the SIP control message.

10. A method in accordance with claim 1, further comprising:

sending the SIP control message to the plurality of communication units using the group address, wherein the determination of the first one or more includes a determination that the first one or more from which a response is not required includes none of the plurality of communication units, wherein the preparing the SIP control message using the group address includes information about the none such that a response is required from all of the plurality of communication units, and wherein the SIP control message further includes an instruction for the all of the plurality of communication units to respond at random respective times during a response time interval.

11. An apparatus for controlling a group call session between a plurality of communication units, the group call session controlled according to a session initiation protocol (SIP), the protocol specifying an SIP control message capable of being transferred to each of the plurality of communication units at an individual address and a response from the each of the plurality of communication units to the SIP control message, the apparatus comprising:

a memory; and a processor coupled to the memory, the processor configured to:

determine that the plurality of communication units share a group address; and send the SIP control message to the plurality of communication units using the group address, the SIP control message specifying one or more of the plurality of communication units from which the response is not required.

12. An apparatus in accordance with claim 11, wherein the processor is further configured to receive a request message associated with the SIP from an initiating one of the plurality of communication units requesting initiation of the group call session according to the SIP.

13. An apparatus in accordance with claim 11, wherein the group call session includes a dispatch call session.

14. An apparatus in accordance with claim 11, wherein the group address includes an Internet Protocol (IP) multicast address.

15. A method for controlling a group call session between a plurality of communication units at least some of the plurality of communication units sharing a group address, the group call session controlled according to a session initiation protocol (SIP), the SIP specifying an SIP control message capable of being transferred to each of the plurality of communication units at an individual address and a response from the each of the plurality of communication units to the SIP control message, the method comprising:

determining a group of the plurality of communication units sharing the group address and one or more of the plurality of communication units not sharing the group address from which the response to the SIP control message associated with the SIP is not required; and preparing a first one of the SIP control message using the group address and a second one of the SIP control message using one or more respective individual addresses for the one or more of the plurality of communication units, the first SIP control message including first information associated with the group and the second SIP control message including second information associated with one of the group and the one or more of the plurality of communication units.

16. A method in accordance with claim 15, further comprising sending the first SIP control message to the group using the group address and the second SIP control message to the one or more of the plurality of communication units using the one or more respective individual addresses, the first and the second information used to control from which of the plurality of communication units the response is required.

17. A method in accordance with claim 15, wherein the group call session includes a dispatch call session.

18. A method in accordance with claim 15, wherein the preparing the SIP control message includes specifying in a portion of the SIP control message that the response is to be sent to the group address, and further specifying a number of responses required before no further responses are required.

19. A method in accordance with claim 15, wherein one of the first and the second information includes a NoResponse header.

20. A method in accordance with claim 15, wherein the SIP control message includes a VIA header having one of a NULL response address, an undefined response address, and an indeterminate response address, the one indicating that the response is not required.

* * * * *